UNITED STATES PATENT OFFICE.

ERNST HERMANN RIESENFELD, OF FREIBURG, GERMANY, ASSIGNOR, BY MESNE ASSIGNMENTS, TO THE CHEMICAL FOUNDATION, INC., A CORPORATION OF DELAWARE.

PROCESS OF MAKING WOOD ALCOHOL FROM METHANE.

1,379,362.   Specification of Letters Patent.   Patented May 24, 1921.

No Drawing.   Application filed October 4, 1918. Serial No. 256,928.

*To all whom it may concern:*

Be it known that I, Dr. ERNST HERMANN RIESENFELD, professor, a subject of the German Emperor, residing at and whose post-office address is Freiburg i/B., 13 Immenthalstrasse, Germany, have invented certain new and useful Improvements in Processes of Making Wood Alcohol from Methane; and I do hereby declare the following to be a full, clear, and exact description of the invention, such as will enable others skilled in the art to which it appertains to make and use the same.

This invention relates to processes for the manufacture of wood alcohol, the object of the invention being to provide a process which will yield wood alcohol in an expeditious and economical manner and which may be carried out on a commercial scale.

By way of example I shall describe a preferred embodiment of my invention in the accompanying specification.

The direct transformation of methyl chlorid into methyl alcohol by the action of alkalis is known to proceed so slowly as to preclude its use in a commercial way. The conditions which must be observed in order to insure the successful carrying out of the reaction on a commercial scale have rendered the processes of making wood alcohol from methane or natural gas difficult of application.

Instead of proceeding in the direct manner above alluded to, the methyl chlorid may be transformed into methyl alcohol indirectly through dimethyl ether. Each reaction of the series of reactions is known in itself but up to the present time no process has been evolved by which the sequence of reactions could be so directed that they would proceed quickly enough to establish a commercially useful method of producing methyl alcohol from methane.

According to the present invention the production of methyl alcohol from methane is accomplished in a way that is commercially useful by transforming methyl chlorid in anhydrous alcoholic solution into dimethyl ether in the presence of alkali, the dimethyl ether being hydrolyzed under pressure while the hydrolysis is accelerated by the presence of a free mineral acid.

The conversion of methane into methyl chlorid may be brought about by any suitable reaction. It may, for example, be prepared by the action of chlorin upon methane in the presence of direct sunlight. The present invention consists in joining this (or any other) method of producing methyl chlorid from methane with a process for the production of methyl alcohol which may, for example, consist of the following two parts.

1. The conversion of methyl chlorid into dimethyl ether.
2. The hydrolysis of the dimethyl ether with production of methyl alcohol.

The methyl chlorid is completely converted, without the formation of by-products, into dimethyl ether in an anhydrous alcoholic solution of caustic soda in accordance with the following equation:

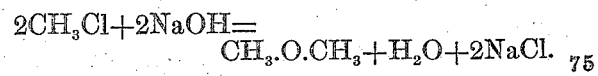

$$2CH_3Cl + 2NaOH = CH_3.O.CH_3 + H_2O + 2NaCl.$$

By using an amount of caustic soda greater than that required by the molecular proportions entering into the above reaction, a considerable portion of the sodium chlorid formed is precipitated and thereby removed from the field of action so that the equilibrium condition which tends to be established when a considerable amount of the methyl chlorid is unconverted is shifted considerably toward the right or in favor of the production of dimethyl ether.

This reaction proceeds at a rate which will make it commercially useful under the influence of pressure, and the speed of the reaction increases approximately in proportion to the square of the pressure, so that the pressure employed is preferably as high as convenient.

The conversion of methyl chlorid into dimethyl ether may be carried out in the following way: The methyl chlorid, at a pressure of say, about 20 atmospheres, is admitted into iron receptacles containing ethyl alcohol and caustic soda. Methyl alcohol may be used instead of ethyl alcohol, but by so doing the speed of the reaction will be lowered, although the same end result will be obtained.

The iron vessels or receptacles are so arranged that they may be kept in continuous motion during the introduction of the methyl chlorid. The receivers contain about 300 liters of alcohol and 60 kilograms of caustic soda for each cubic meter of their capacity. The same, or better result, will be obtained if, instead of caustic soda, an equivalent quantity of caustic potash is used.

The formation of the dimethyl ether will begin during the absorption of the methyl chlorid. During the reaction a considerable amount of heat is evolved which brings about a rise of temperature and an increase in the speed of the reaction. Thus the iron receiver and its contents are at first considerably heated. In the course of several hours the receiver will cool off, which cooling indicates that the reaction is completed.

The gas in the receiver is now allowed to escape until the pressure is reduced to atmospheric pressure. The escaping gas is composed practically entirely of methyl chlorid which is compressed to a pressure of 20 atmospheres and again subjected to the manufacturing process. The receiver is thereupon connected with a vacuum pump and the pressure is reduced until practically all of the dimethyl ether dissolved in the alcohol is removed. Finally the alcohol with the sodium chlorid and caustic sludge or mud is removed from the iron receiver. The sludge of sodium chlorid and caustic is allowed to settle and the clear supernatant liquid is fractionated, whereby the alcohol is separated from the water formed during the action. The ethyl alcohol may be reutilized in the process for the production of dimethyl ether. The sodium chlorid and caustic sludge are dried. The mixture of water and alcohol liberated during the drying process is fractionated and the sludge residue is regenerated by electrolysis to form chlorin and caustic alkali.

The hydrolysis of the dimethyl ether according to the equation $CH_3OCH_3 + H_2O = 2CH_3OH$ proceeds very slowly and tends to an equilibrium condition in which there is very little alcohol and a large amount of ether. However, the equilibrium shifts with an increase in temperature to the right, so that at about 100 degrees Celsius, about 25%, and at 125 degrees Celsius about 30% of the alcohol is present in the equilibrium.

The commercial employment of high temperature is rendered difficult because of the excedingly high pressures which would thereby arise. According to the process of fractional hydrolysis hereinafter described, a substantially complete conversion of dimethyl ether into methyl alcohol may be accomplished at a temperature as low as 80 degrees Celsius in the presence of accelerating agents. Among others, a 20% sulfuric acid has been shown to be an excellent accelerating agent at the said temperatures.

The following procedure for the conversion of dimethyl ether into methyl alcohol may be observed: The liquid dimethyl ether, subjected to a pressure of about 5 atmospheres, is heated for about 24 hours at about 80 degrees Celsius with dilute sulfuric acid in tall, narrow, iron cylinders tested for a pressure of 200 atmospheres, the said cylinders being continuously shaken during the heating process. One kilogram of 20% sulfuric acid is required for each kilogram of dimethyl ether. In the process about $\frac{1}{5}$ of the dimethyl ether is transformed into methyl alcohol which dissolves in the sulfuric acid. After cooling, the sulfuric acid is removed and the reaction is started afresh by the addition of new sulfuric acid and new dimethyl ether.

By repetition of the process, maintaining the proportion of one part of acid to one part of dimethyl ether, practically all of the dimethyl ether may be converted into methyl alcohol. The methyl alcohol is separated from the solution of sulfuric acid by fractional distillation. The sulfuric acid is diluted with water and then returned to the reaction process.

It is of course to be understood that the embodiment of my process as above set forth is simply one of several which may be utilized to attain the same end within the scope of the sub-joined claims.

I claim:

1. The process of making wood alcohol from methyl chlorid, consisting in converting methyl chlorid in anhydrous alcoholic solution into dimethyl ether by heating with caustic alkali under pressure, and subsequently hydrolyzing the dimethyl ether under pressure, the hydrolysis being accelerated by the presence of free acid.

2. The process of making wood alcohol from methyl chlorid, consisting in converting methyl chlorid in anhydrous alcoholic solution into dimethyl ether by heating with caustic alkali under pressure, and subsequently hydrolyzing the dimethyl ether under pressure, the hydrolysis being accelerated by the presence of free mineral acid.

3. The process of making wood alcohol from methyl chlorid, consisting in adding an excess of caustic alkali to the methyl chlorid in anhydrous alcoholic solution, converting said methyl chlorid into dimethyl ether by heating under pressure, and subsequently hydrolyzing the dimethyl ether under pressure, the hydrolysis being accelerated by the presence of free acid.

4. The process of making wood alcohol from methyl chlorid consisting in adding an excess of caustic alkali to the methyl chlorid in anhydrous alcoholic solution, converting said methyl chlorid into dimethyl ether by heating under pressure, and subsequently hydrolyzing the dimethyl ether under pressure, the hydrolysis being accelerated by the presence of free mineral acid.

5. The process of making wood alcohol from methyl chlorid, consisting in converting methyl chlorid in anhydrous alcoholic solution into dimethyl ether by heating with caustic alkali under pressure; separating the dimethyl ether from the unchanged methyl chlorid by reducing the pressure in such a manner that at first only the methyl chlorid, which dissolves less readily in the alcohol, escapes, and later removing the dimethyl ether, which dissolves more readily in the alcohol, by further reduction of pressure; converting the dimethyl ether into methyl alcohol by repeated hydrolysis in the presence of free mineral acid, this being accomplished through the separation of the hydrous solution, which absorbs the alcohol formed, from the ether, and repeating the hydrolyzing process after a fresh quantity of acid is added and an addition for the converted dimethyl ether is made.

6. The process of making wood alcohol from methyl chlorid consisting in converting methyl chlorid in anhydrous alcoholic solution into dimethyl ether by heating with caustic alkali under pressure; separating the dimethyl ether from the unchanged methyl chlorid by reducing the pressure in such a manner that at first only the methyl chlorid, which dissolves less readily in the alcohol, escapes and later removing the dimethyl ether, which dissolves more readily in the alcohol, by further reduction of pressure, converting the dimethyl ether into methyl alcohol by repeated hydrolysis, this being accomplished through the separation of the hydrous solution, which absorbs the alcohol formed, from the ether and by repeating the hydrolyzing process after a fresh quantity of the hydrolysis accelerating agent is added and an addition for the converted dimethyl ether is made.

In testimony whereof I affix my signature, in presence of two witnesses.

ERNST HERMANN RIESENFELD.

Witnesses:
JOHANN LOCHTIST ZWICK,
AUGUST LITUH.